(12) United States Patent
Champa et al.

(10) Patent No.: US 11,167,508 B2
(45) Date of Patent: Nov. 9, 2021

(54) SYSTEM AND METHOD FOR FABRICATING AND CURING LARGE COMPOSITE STRUCTURES

(71) Applicant: Spirit AeroSystems, Inc., Wichita, KS (US)

(72) Inventors: Michael Arthur Champa, Clearwater, KS (US); John Patrick McPherson, Haysvill, KS (US); Blaise Francis Bergmann, Clearwater, KS (US); James Edward Westerman, Derby, KS (US); Brian Charles Clapp, Goddard, KS (US); Aaron Rae Heitmann, Andover, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 169 days.

(21) Appl. No.: 16/525,772

(22) Filed: Jul. 30, 2019

(65) Prior Publication Data

US 2021/0031467 A1   Feb. 4, 2021

(51) Int. Cl.
*B29C 53/58*   (2006.01)
*B29C 70/32*   (2006.01)
*B29C 70/50*   (2006.01)
*B29C 53/62*   (2006.01)

(52) U.S. Cl.
CPC ............ *B29C 70/504* (2013.01); *B29C 53/62* (2013.01); *B29C 70/32* (2013.01); *B29C 53/587* (2013.01)

(58) Field of Classification Search
CPC . B29C 70/32; B29C 53/62; B29C 2793/0072; B29C 70/545; B29L 2031/3082
See application file for complete search history.

(56) References Cited

U.S. PATENT DOCUMENTS

| 4,171,999 | A | * | 10/1979 | Allen | .................... | B65D 90/08 156/174 |
| 4,401,495 | A | * | 8/1983 | McKinney | ............ | B29C 53/605 156/173 |

(Continued)

OTHER PUBLICATIONS

International Search Report and Written Opinion, dated Oct. 27, 2020, for PCT Appln. No. PCT/US2020/041892, Filed Jul. 14, 2020 and all references cited therein.

*Primary Examiner* — Jeffry H Aftergut
(74) *Attorney, Agent, or Firm* — Hovey Williams LLP

(57) ABSTRACT

A system and method for fabricating large composite fuselages or other vehicle structures, in which the composite structure is fabricated and cured as on a tool, segmented and removed from the tool without disassembling the tool, and then reassembled off the tool to reform the large structure. The tool includes mandrel segments attached to a substructure. The attachments may be moveable to accommodate differential expansion and contraction during curing, and the tool may be rotatable to facilitate access. A composite material of resin and synthetic fibers is applied over the mandrel segments to fabricate the structure on the tool. Caul plates are secured over the composite material, and the composite material is cured on the tool. The resulting structure is cut into part segments which are then removed from the tool, and the part segments are joined to reassemble the large composite structure off the tool.

9 Claims, 18 Drawing Sheets

(56) References Cited

U.S. PATENT DOCUMENTS

| | | | | |
|---|---|---|---|---|
| 4,512,836 | A | * | 4/1985 | Tucci .................... B29C 53/587 |
| | | | | 156/174 |
| 5,681,513 | A | | 10/1997 | Farley |
| 8,114,241 | B2 | * | 2/2012 | Iagulli ..................... B65B 11/04 |
| | | | | 156/285 |
| 2006/0145049 | A1 | | 7/2006 | Blankinship |
| 2009/0277994 | A1 | | 11/2009 | Fabiano et al. |
| 2010/0088896 | A1 | * | 4/2010 | Meyer ....................... B64F 5/10 |
| | | | | 29/897.2 |
| 2012/0023727 | A1 | | 2/2012 | Cédric et al. |
| 2013/0220521 | A1 | * | 8/2013 | Senibi .................... B29C 70/32 |
| | | | | 156/173 |
| 2014/0377491 | A1 | * | 12/2014 | Legrand ................ B29C 70/347 |
| | | | | 428/36.1 |

* cited by examiner

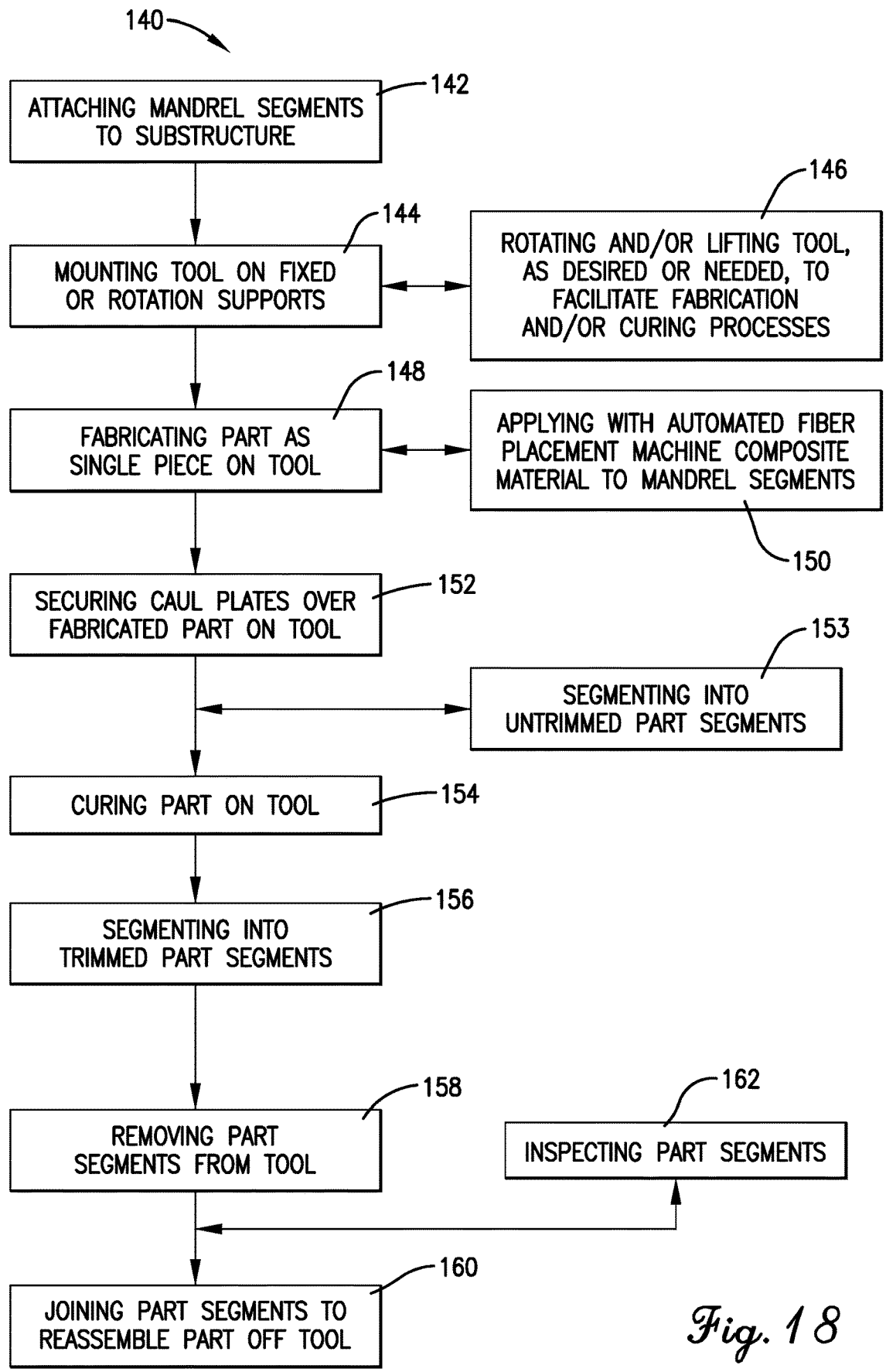

SYSTEM AND METHOD FOR FABRICATING AND CURING LARGE COMPOSITE STRUCTURES

FIELD

The present invention relates to systems and methods for fabricating and curing large composite structures, and more particularly, embodiments concerns a system and method for fabricating and curing large composite aircraft, aerospace, or other vehicle fuselages, bodies, or other part structures.

BACKGROUND

The fabrication and curing of large composite structures, such as aircraft fuselages, is a complex process involving tools which physically support the composite materials until the composite materials are at least partially cured. One solution is to fabricate and cure a plurality of independent part segments on different supportive tools, and then assemble the part segments to form the structure. However, this method suffers from several problems and limitations, including that the independent fabrication of the parts requires either that the parts be fabricated and cured one at a time, which is inefficient, or that multiple fabrication machines be provided and maintained, which is costly.

Another solution is to fabricate such a structure as a single piece on a large tool and then disassemble and remove the tool from within the fabricated and cured structure. However, this method also suffers from several problems and limitations, including that the tool must be designed to be disassembled into sufficiently small subcomponents so as to be removable through whatever opening remains in the fabricated and cured structure. Further, the processes of assembling and disassembling so many small tool subcomponents is time-consuming and inefficient.

This background discussion is intended to provide information related to the present invention which is not necessarily prior art.

SUMMARY

Embodiments address the above-described problems and limitations in the prior art by providing a system and method for fabricating and curing large composite aircraft, aerospace, or other vehicle fuselages, bodies, or other part structures, wherein the composite part is at least partially fabricated and cured on a tool, cut or otherwise segmented to facilitate removing it from the tool, removed from the tool without disassembling the tool, and then reassembled off the tool to reform the large composite part.

In a first embodiment, a system is provided for fabricating and curing a large composite part. The system may include a tool, an automated fiber placement machine, a curing mechanism, a cured material cutting mechanism, and a reassembly mechanism. The tool may be configured to support the large composite structure during the fabrication and curing processes, and may include a substructure and one or more mandrel segments removably attached to the substructure and providing a surface on which the large composite part may be fabricated. The automated fiber placement machine may be configured to apply composite material comprising resin and synthetic fibers onto the mandrel segments to fabricate the large composite part as a single piece on the tool. The curing mechanism may be configured to cure the composite material on the mandrel segments to cure the large composite part on the tool. The cured material cutting mechanism may be configured to cut the large composite part on the tool into a plurality of trimmed part segments which may then be removed from the tool without disassembling the tool. The reassembly mechanism may be configured to join the plurality of trimmed part segments to reassemble the large composite part off the tool.

In various implementations, the first embodiment may include any one or more of the following additional features. The tool may include a plurality of the mandrel segments, and the system may further include an uncured material cutting mechanism configured to cut the large composite part on the tool into a plurality of untrimmed part segments prior to the curing process. The large composite structure may be an aircraft fuselage which has a length of at least five meters. The substructure may be constructed of a first material having a first coefficient of thermal expansion and the mandrel segments may be constructed of a second material having a second coefficient of thermal expansion which is lower than the first coefficient of thermal expansion, and the mandrel segments may be fixedly attached to the substructure at at least one location and movably attached to the substructure at at least one other location. The mandrel segments may include structure features configured to create corresponding structure components in the large composite part. The mandrel segments may include grooves configured to accommodate the cutting mechanism when cutting the large composite part into the trimmed part segments. The mandrel segments may include joining features configured to create corresponding joining components in the trimmed part segments which facilitate joining the trimmed part segments to reassemble the large composite part. The curing mechanism may include an autoclave, the cured material cutting mechanism may include a cutting disc, and the reassembly mechanism may include a fastener gun. The system may further include a center hub extending through a longitudinal axis of the substructure, a first interface element coupled with a first end of the center hub and a second interface element coupled with a second end of the center hub, and a rotation mechanism coupled with the interface elements and configured to allow the tool to be rotated about the longitudinal axis. The system may further include one or more caul plates configured to be secured over the composite material on the mandrel segments prior to curing the composite material.

In a second embodiment, a method is provided for fabricating and curing a large composite part. The method may include the following steps. The large composite structure may be supported with a tool during the fabrication and curing processes, and the tool may include a substructure and one or more mandrel segments removably attached to the substructure and providing a surface on which the large composite part may be fabricated. A composite material comprising resin and synthetic fibers may be applied onto the mandrel segments with an automated fiber placement machine to fabricate the large composite part as a single piece on the tool. The composite material may be cured on the mandrel segments with a curing mechanism to cure the large composite part on the tool. The large composite part may be cut on the tool with a cured material cutting mechanism into a plurality of trimmed part segments which may then be removed from the tool without disassembling the tool. The plurality of trimmed part segments may be reassembled with a reassembly mechanism to reassemble the large composite part off the tool.

In various implementations, the second embodiment may include any one or more of the following features. The tool may include a plurality of the mandrel segments, and the method may further include cutting with an uncured material cutting mechanism the large composite part on the tool into a plurality of untrimmed part segments prior to the curing process. The large composite structure may be an aircraft fuselage which has a length of at least five meters. The substructure may be constructed of a first material having a first coefficient of thermal expansion and the mandrel segments may be constructed of a second material having a second coefficient of thermal expansion which is lower than the first coefficient of thermal expansion, and the mandrel segments may be fixedly attached to the substructure at at least one location and movably attached to the substructure at at least one other location. The mandrel segments may include structure features configured to create corresponding structure components in the large composite part. The mandrel segments may include grooves configured to accommodate the cured material cutting mechanism when cutting the large composite part into the trimmed part segments. The mandrel segments may include joining features configured to create corresponding joining components in the plurality of trimmed part segments which facilitate joining the trimmed part segments to reassemble the large composite part. The curing mechanism may include an autoclave, the cured material cutting mechanism may include a cutting disc, and the reassembly mechanism may include a fastener gun. The method may further include a center hub extending through a longitudinal axis of the substructure, a first interface element coupled with a first end of the center hub and a second interface element coupled with a second end of the center hub, and a rotation mechanism coupled with the interface elements and configured to allow the tool to be rotated about the longitudinal axis. The method may further include securing one or more caul plates over the composite material on the mandrel segments prior to curing the composite material.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 18 is a flowchart of an embodiment of a method of at least partially fabricating and curing a large composite structure.

Figure 1:
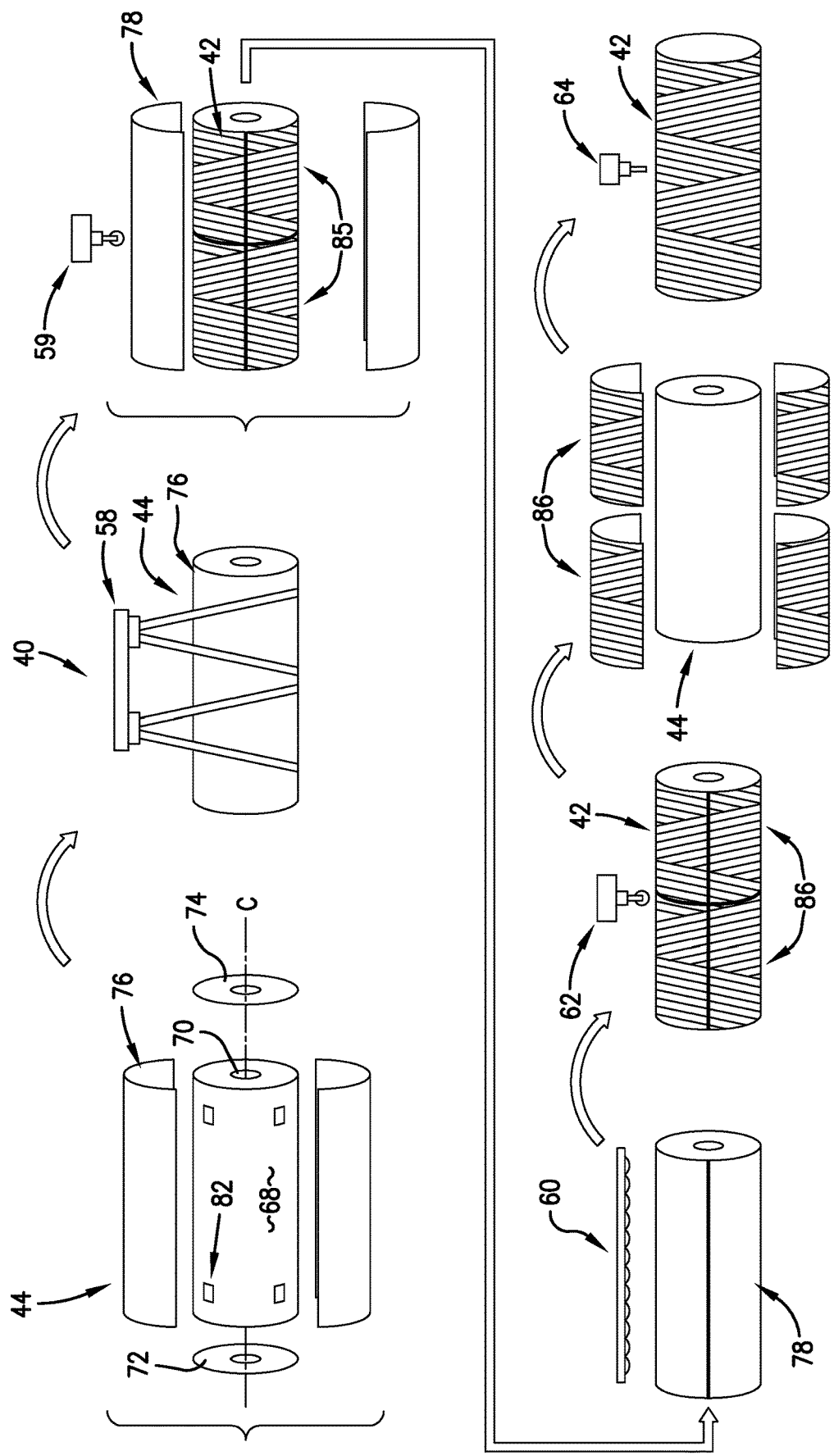
FIG. 1 is a depiction of an embodiment of a system engaged in a process of at least partially fabricating and curing a large composite structure.
Figure 2:
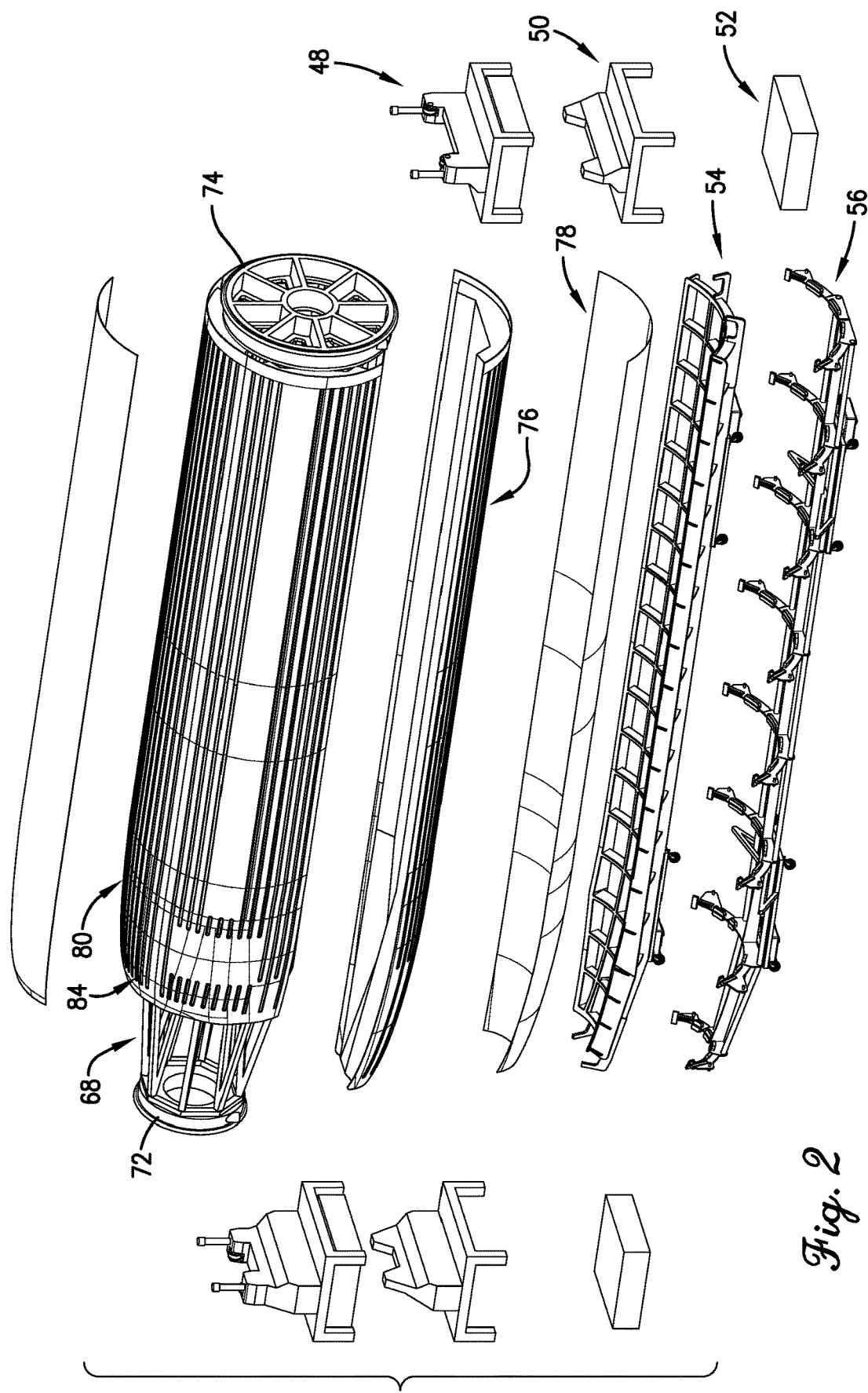
FIG. 2 is an exploded perspective view of certain components of the system of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Embodiments provide a system and method for fabricating large composite aircraft, aerospace, or other vehicle fuselages, bodies, or other part structures, wherein the composite part is at least partially fabricated and cured on a tool, cut or otherwise segmented to facilitate removing it from the tool, removed from the tool without disassembling the tool, and then reassembled off the tool to reform the large composite part. As used herein, a "large" part shall mean a part which is, in various implementations, at least five meters, or at least ten meters, or at least fifteen meters in at least one dimension. For example, the large composite structure may be a generally cylindrical aircraft fuselage which is at least five meters in length along a longitudinal axis.

An embodiment of such a system for fabricating a large composite aircraft, aerospace, or other vehicle fuselage, body, or other part may include a tool having a substructure and one or more mandrel segments removably attachable to the substructure. The substructure may be configured to physically and operationally support the mandrel segments during fabrication and curing of the part. The substructure may have substantially any suitable design and shape as may be desired or required for a particular application. In one implementation, in which the part to be fabricated is a generally cylindrical aircraft fuselage, the substructure may be generally cylindrically shaped, while in other implementations, the substructure may be, for example, geometrically or irregularly shaped. The substructure may be constructed of substantially any suitable material, such as metal or composite. In one implementation, the substructure may include a hub extending along a longitudinal axis C through the substructure, and first and second interface elements coupled with opposite ends of the hub and configured to allow for mounting the substructure on rotatable or fixed and/or movable structures to facilitate the fabrication, curing, and/or removal of the part.

The mandrel segments may be configured to physical and operationally support the part during fabrication and curing of the part. The mandrel segments may have substantially any suitable design and shape as may be desired or required for a particular application. The mandrel segments may include structure features configured to create corresponding structure components in the fabricated part. In one implementation, there may a single mandrel segment, while in other implementations, there may be any number of mandrel segments (e.g., between two and ten, or between two and four) as may be desired or required for a particular application. In one implementation, the mandrel segments may be substantially similar or even identical, while in other implementations, one or more of the mandrel segments may differ significantly in size and/or shape from the other mandrel segments. In one implementation, in which the part to be fabricated is a generally cylindrical aircraft fuselage, a single mandrel segment may be generally cylindrically shaped, while multiple mandrel segments may be generally curved so as to fit together on the substructure to form a generally cylindrical shape.

The one or more mandrel segments may be constructed of substantially any suitable material, such as composite such has bismaleimide or other high temperature resin and carbon fiber, Kevlar, fiberglass, or other synthetic fibers. In one implementation, the substructure and the mandrel segments may be constructed of the same or relevantly similar materials and have significantly the same or the same expansion and contraction characteristics and/or other relevant characteristics, while in other implementations, they may be constructed of relevantly different materials and have different expansion and contraction characteristics or other relevant characteristics. For example, in one implementation, the substructure may be constructed from steel having a relatively high coefficient of thermal expansion, and the mandrel segments may be constructed from composite or an iron-nickel alloy such as Invar having a relatively low coefficient of thermal expansion. In such a case, the mandrel segments may be fixedly attached to the substructure at at least one location and movably attached to the substructure at at least one other location with slip joints or other movable attachment mechanisms to allow the mandrel segments to "float" on the substructure and thereby accommodate differential expansion and contraction movement or other relative movement of the mandrel segments and the substructure (such as while being heated to cure the part).

In one implementation, the mandrel segments may be provided with grooves to accommodate a cutting mechanism to facilitate cutting the part along defined lines in order to remove the part from the tool. In various implementations, the part may be cut or otherwise segmented into untrimmed segments prior to curing and/or cut or otherwise segmented into trimmed segments after curing, while remaining on the tool. In one implementation, the resulting part segments may be reassembled off the tool by being butt-joined together, while in other implementations, the mandrel segments may be configured to shape the part segments to facilitate reassembly. For example, the mandrel segments may be configured to impart joggle structures or other joining structures to create joining components which facilitate joining the part segments together to reform the large composite part.

In one implementation, the system may further include one or more caul plates configured to be positioned on the fabricated part prior to curing to produce a smoother finish for the cured part.

An embodiment of a method for fabricating the large composite aircraft, aerospace, or other vehicle fuselage, body, or other part may include the following steps. In one implementation, the method may employ some or all of the components of the above-described system. The tool may be assembled by attaching the one or more mandrel segments to the substructure. The part may be at least partially fabricated as a single piece on the tool (using, e.g., automated fiber placement technology). If used, the one or more caul plates may be secured (by, e.g., vacuum bagging) over the fabricated part. In one implementation, the part may be cut or otherwise segmented into untrimmed segment prior to curing. The part may be at least partially cured (by, e.g., autoclaving) on the tool. The at least partially fabricated and cured part may be cut or otherwise segmented into a plurality of trimmed part segments prior to removal from the tool. The part segments may be removed from the tool without disassembling the tool. The part segments may be reassembled to reform the large composite part.

Referring to FIGS. 1-17, an example implementation of the above-described system 40 is shown adapted for fabricating a large generally cylindrical composite fuselage part 42 for an aircraft, wherein the composite fuselage is at least partially fabricated and cured on the tool 44, cut or otherwise segmented to facilitate removing it from the tool 44 without disassembling the tool 44, removed from the tool 44, and then reassembled off the tool 44 to reform the large composite fuselage 42. The system 40 may include the tool 44, first and second rotation support mechanisms 48, one or more fixed support mechanisms 50, one or one or more guided vehicles 52, one or more mandrel segment and caul plate handling mechanisms 54, one or more part segment handling mechanisms 56, an automated fiber placement machine 58, an uncured material cutting mechanism 59; a curing mechanism 60, a cured material cutting mechanism 62, and a reassembly mechanism 64.

Figure 3:
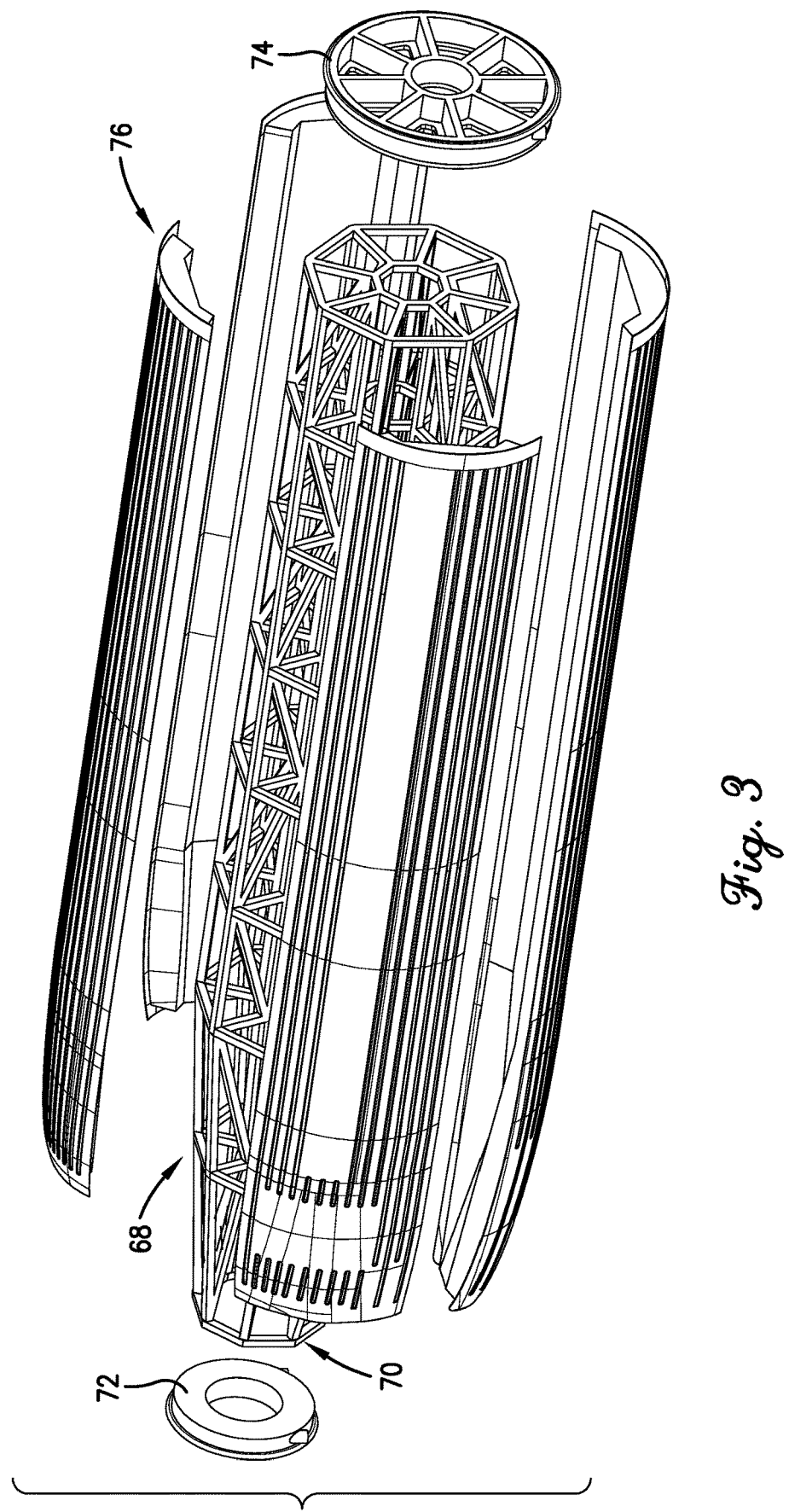
FIG. 3 is an exploded perspective view of certain components of a tool component of the system of FIG. 1.

The tool 44 may be configured to physically and operationally support the part 42 during fabrication and curing. In particular, the tool 44 may be moveable and positionable to facilitate fabricating the part 42 using the automated fiber placement machine 58, and may be further moveable and positionable, with the fabricated part 42 thereon, to facilitate curing the part 42 using the curing mechanism 60. Referring particularly to FIG. 3, the tool 44 may include a substructure 68, a central hub 70 and first and second interface rings 72,74 attached to opposite ends of the hub 70, one or more mandrel segments 76 removably attachable to the substructure 68, and one or more caul plates 78.

The substructure 68 may be configured to physically and operationally support the mandrel segments 76 during fabrication and curing of the part 42. The substructure 68 may have substantially any suitable design and shape as may be desired or required for a particular application. In this example implementation, the part 42 to be fabricated is a generally cylindrical aircraft fuselage, so the substructure 68 may also be generally cylindrically shaped or, at least, otherwise elongated along the longitudinal axis C. The substructure 68 may be constructed of substantially any suitable material, such as metal or composite. In this example implementation, the substructure 68 may be constructed of steel.

The central hub 70 may extend through the substructure 68 along the longitudinal axis C and may be configured to physically and/or functionally cooperate with the interface rings 72,74 to facilitate supporting and/or rotating the substructure 68. In one implementation, the central hub 70 may be configured to experience minimal deflection of approximately between 0.055 inches and 0.100 inches when loaded. The first and second interface rings 72,74 may physically and/or functionally cooperate with opposite ends of the central hub 70 and may be configured to facilitate mounting the substructure 68 on the rotating and/or fixed support mechanisms 48,50 to facilitate fabricating, curing, and/or removing the part 42.

The mandrel segments 76 may be configured to physical and operationally support the part 42 during fabrication and curing of the part 42. The mandrel segments 76 may have substantially any suitable design and shape as may be desired or required for a particular application. In this example implementation, the mandrel segments 76 may include surface features 80 configured to create corresponding components, such as stringers and/or other structural or operational features, in the fabricated part 42.

In one implementation, there may a single mandrel segment 76, while in other implementations, there may be any number of mandrel segments 76 (e.g., between two and ten, or between two and four) as may be desired or required for particular applications. In one implementation, the mandrel segments 76 may be substantially similar or even identical, while in other implementations, one or more of the mandrel segments 76 may differ significantly in size and/or shape from the other mandrel segments 76. In this example implementation, there may between two and four, mandrel segments 76, which are substantially similar in size and/or shape to each other, and which and are generally curved so that, when they are attached to the substructure 68, they fit together to form the generally cylindrical shape of the fuselage part 42.

The one or more mandrel segments 76 may be constructed of substantially any suitable material, such as a composite. In one implementation, the mandrel segment composite may include bismaleimide or other high temperature resin and carbon fiber, Kevlar, fiberglass, or other synthetic fibers. In one implementation, the substructure 68 and the mandrel segments 76 may be constructed of the same or relevantly similar materials and have the significantly the same or the same expansion and contraction characteristics and/or other relevant characteristics, while in other implementations, they may be constructed of relevantly different materials and have different expansion and contraction characteristics (i.e., different coefficients of thermal expansion) or other relevant characteristics. In this example implementation, each mandrel segment 76 may include a Pan board substructure and a bismaleimide composite surface.

In one implementation, the substructure 68 and the mandrel segments 76 may be constructed of the same or relevantly similar materials and have the significantly the same or the same expansion and contraction characteristics and/or other relevant characteristics, while in other implementations, they may be constructed of relevantly different materials and have different expansion and contraction characteristics or other relevant characteristics. In this example implementation, the substructure 68 is constructed from steel having a relatively high coefficient of thermal expansion, and the mandrel segments 76 are constructed from bismaleimide and graphite composite having a relatively low coefficient of thermal expansion. Thus, the mandrel segments 76 may be fixedly attached to the substructure 68 at at least one location and movably attached to the substructure 68 at at least one other location with slip joints or other movable attachment mechanisms 82 to allow the mandrel segments 76 to "float" on the substructure 68 and thereby accommodate differential expansion and contraction movement or other relative movement of the mandrel segments 76 and the substructure 68 (such as might occur during curing).

In one implementation, the mandrel segments 76 may be provided with grooves 84 to accommodate the uncured and/or cured material cutting mechanisms 59,62 to facilitate cutting the part 42 along defined lines in a plurality of part segments 86. In one implementation, the part segments 86 may reassembled by being butt-joined together. In other implementations, the mandrel segments 76 may be configured to shape the part segments 86 to facilitate reassembly. For example, the mandrel segments 76 may be configured to impart joggle structures or other joining structures to enable lap-splicing and/or otherwise joining the part segments 86 together to reform the large composite part 42.

Figure 6:
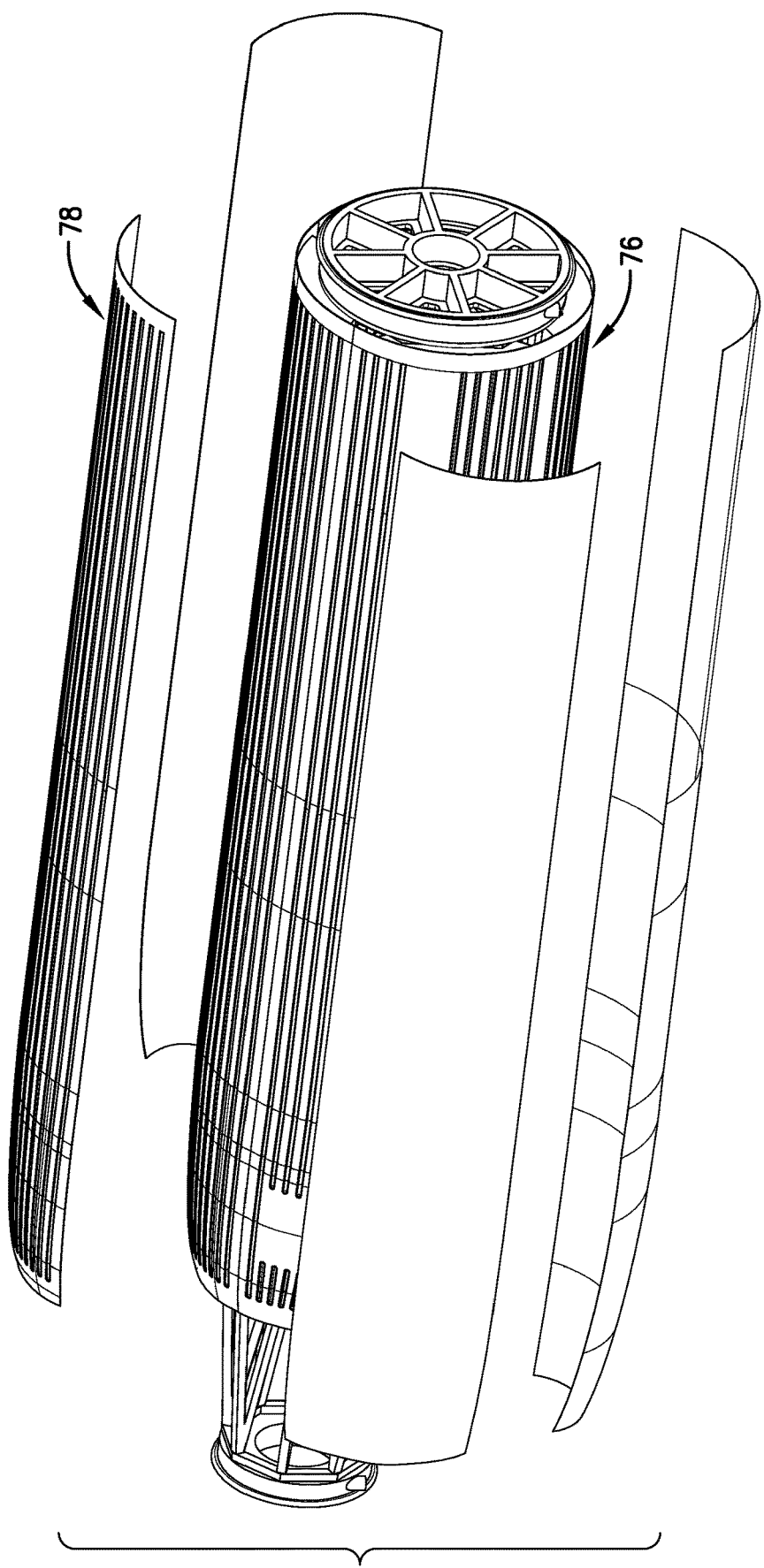
FIG. 6 is an exploded perspective view of caul plate components of the system of FIG. 1.

Referring particularly to FIG. 6, the one or more caul plates 78 may be configured to be positioned over the fabricated part 42 on the mandrel segments 76 and to provide a smoother finish to the cured part 42. In this example implementation, the caul plates 78 may be secured in position by vacuum bagging. In one implementation, each caul plate 78 may be constructed of bismaleimide composite and may have a thickness of approximately between one-sixteenth inch and one-half inch, or between one-sixteenth inch and one-quarter inch, or one-eighth inch.

Figure 4:
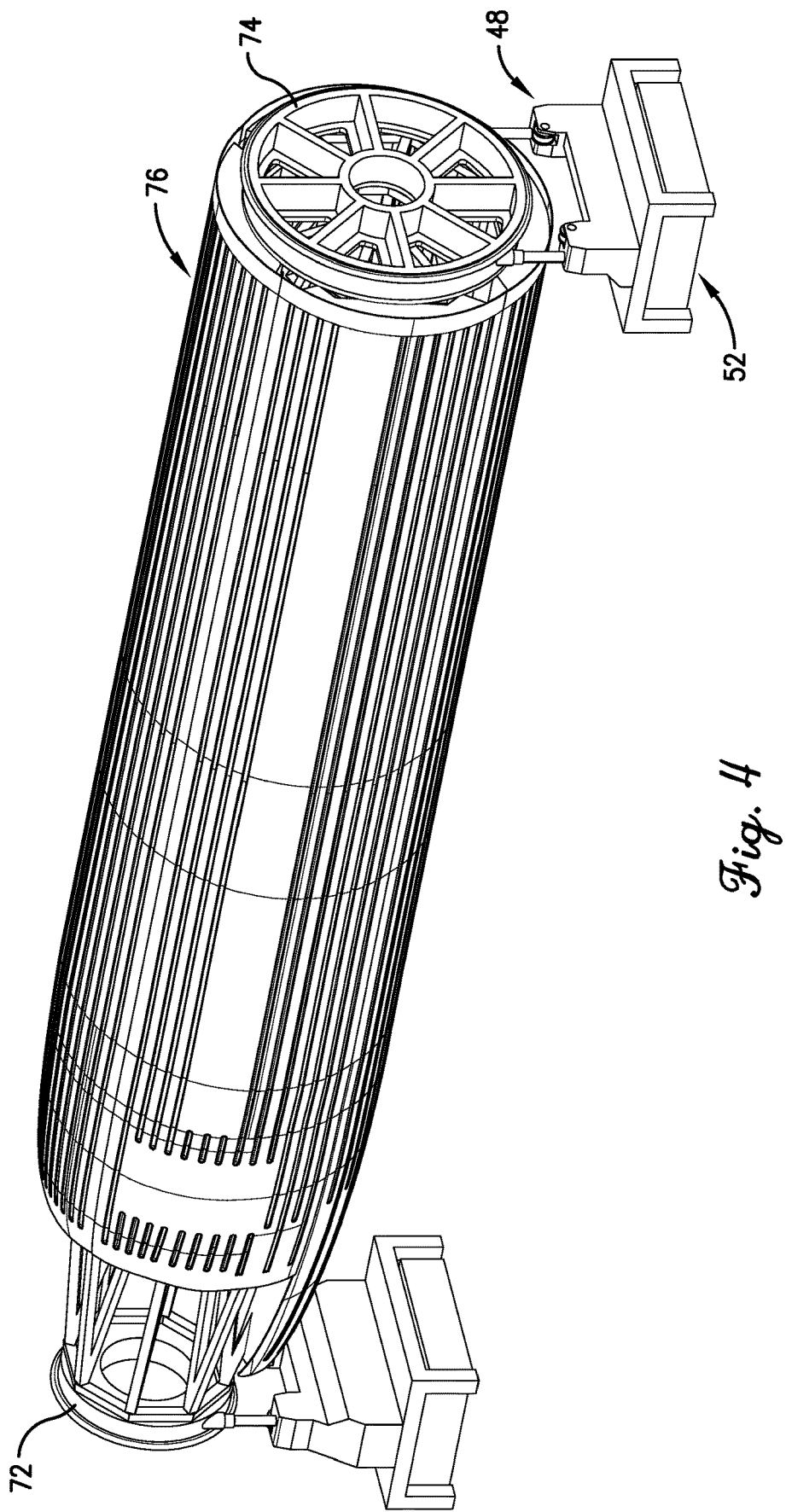
FIG. 4 is a perspective view of the tool component mounted on rotating support mechanisms and guided vehicle components of the system of FIG. 1.
Figure 5:
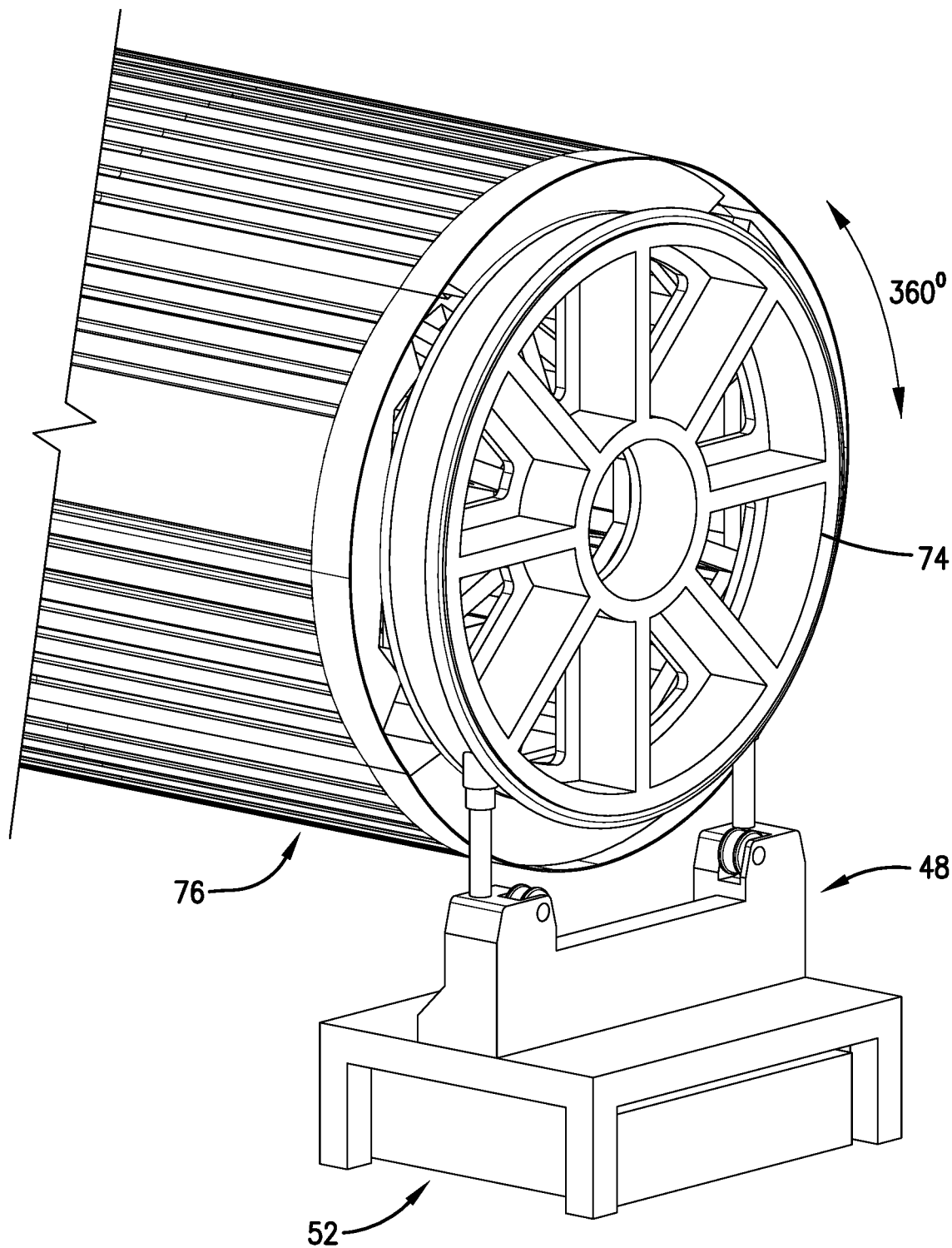
FIG. 5 is a fragmentary perspective view of the rotating support components rotating and/or lifting the tool component.

Referring particularly to FIGS. 4 and 5, the first and second rotation support mechanisms 48 may be configured to engage and cooperate with the first and second interface rings 72,74 to allow for rotating the tool 44 approximately between one degree and three hundred and sixty degrees, or between one degree and one hundred and eighty degrees, during fabrication, curing, and or removal of the part 42. In one implementation, the rotation support mechanisms 48 may be further configured to engage and cooperate with the first and second interface rings 72,74 to allow for lifting the tool 44 approximately between one inch and thirty-six inches, or between one inch and twenty-eight inches, or between one inch and twenty inches. In various implementations, the first and second rotation support mechanisms 48 may be separate units or may be connected together.

The one or more fixed support mechanisms 50 may be configured to receive and physically support the tool 44 during various processes, including receiving and physically supporting the tool 44 and the fabricated part 42 thereon during the curing process. In one implementation, the fixed support mechanisms 50 may engage and cooperate with the first and second interface rings 72,74 to support the tool 44. In one implementation, the fixed support mechanisms 50 may be further configured to engage and cooperate with the first and second interface rings 72,74 to allow for lifting the tool 44 approximately between one inch and thirty-six inches, or between one inch and twenty-eight inches, or between one inch and twenty inches. In various implementations, the first and second fixed support mechanisms 50 may be separate units or may be connected together.

The one or more guided vehicles 52 may be configured to be positioned under or otherwise receive or engage the rotation and/or fixed support mechanisms 48,50 and facilitate moving the support mechanisms 48,50 and the tool 44 supported thereon to and from, e.g., the automated fiber placement machine 58 and/or curing mechanism 60. In one implementation, the guided vehicles 52 may be manually guided, while in another implementation, the guided vehicles 52 may be computer guided.

Figure 7:
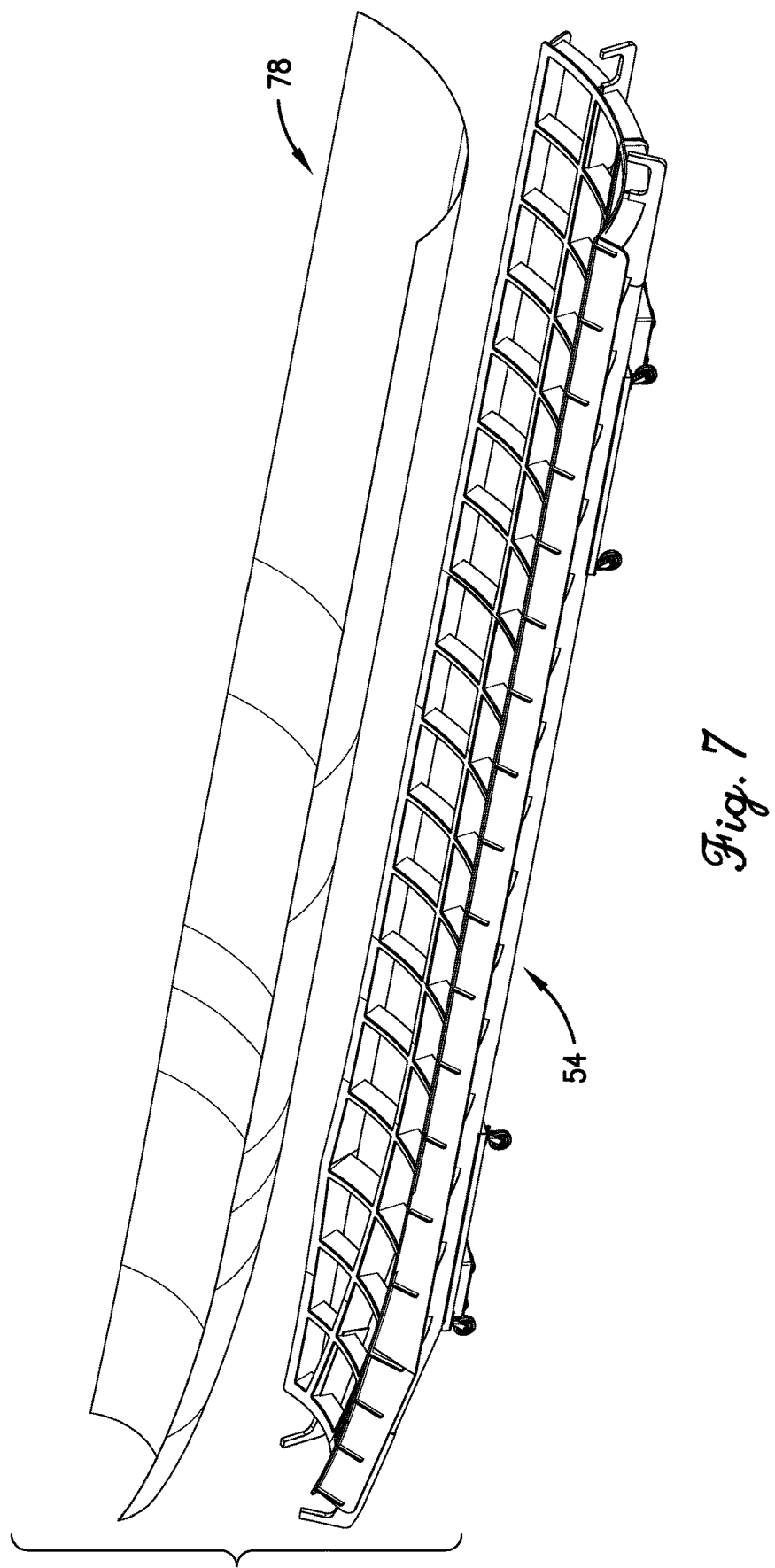
FIG. 7 is an exploded perspective view of a mandrel segment and caul plate handling mechanism component of the system of FIG. 1.
Figure 8:
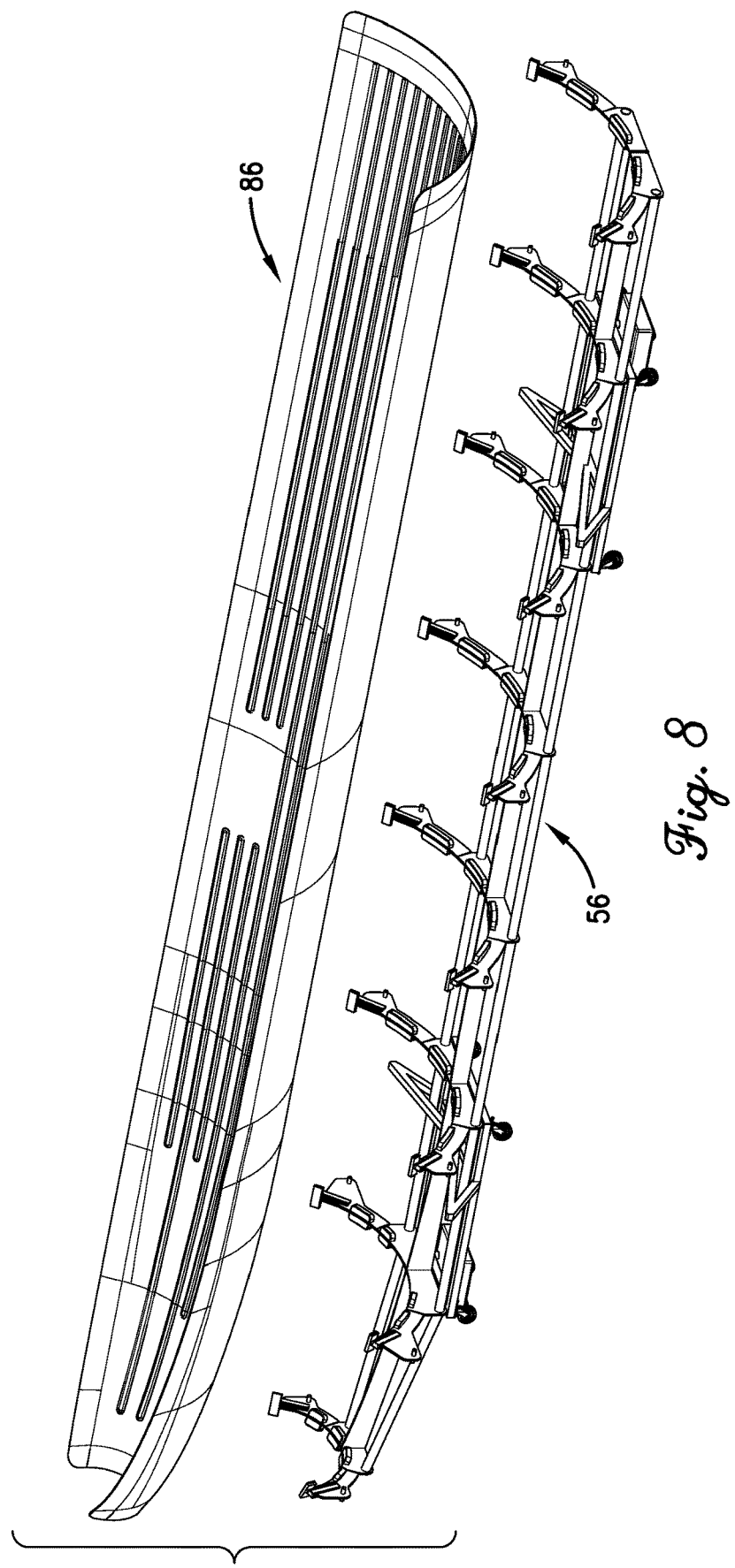
FIG. 8 is an exploded perspective view of a part segment handling mechanism component of the system of FIG. 1.
Figure 9:
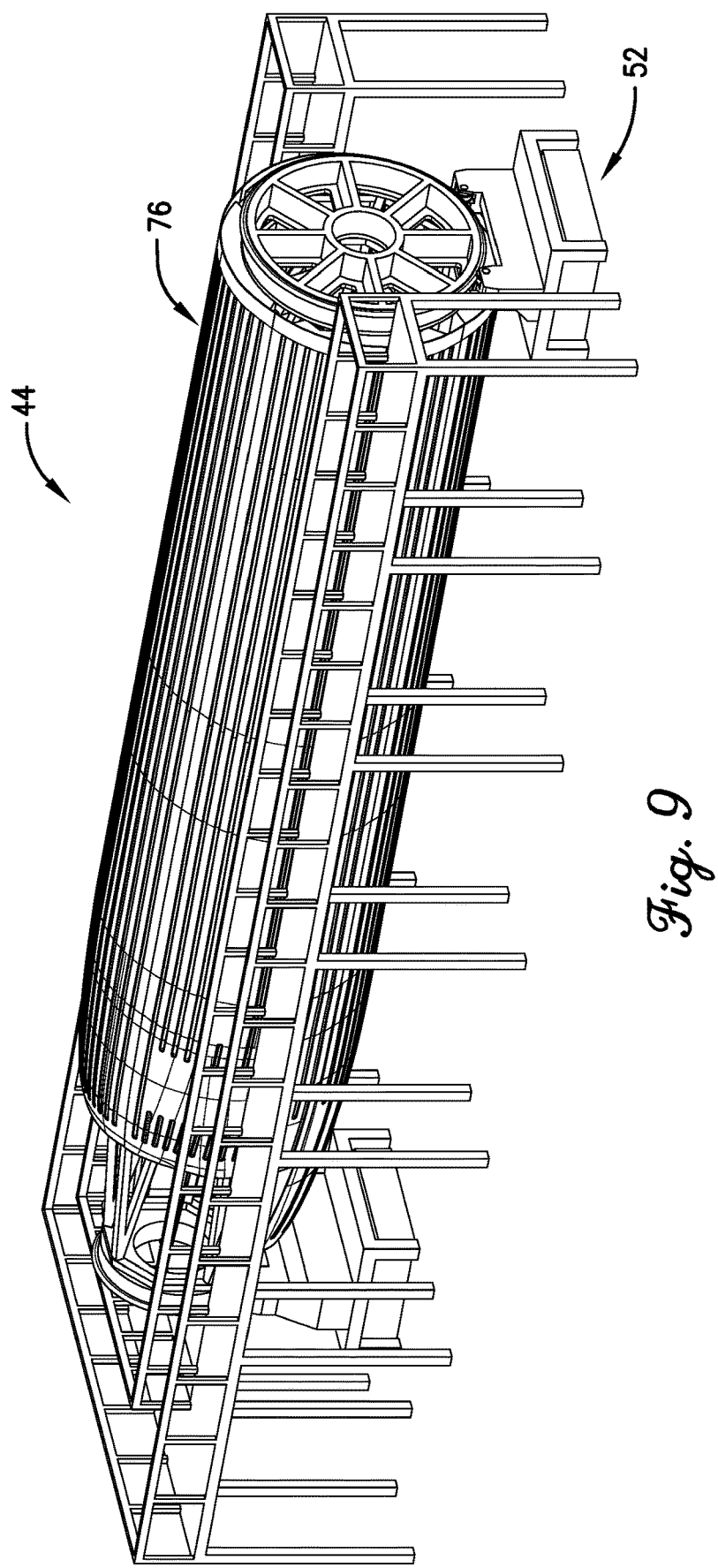
FIG. 9 is a perspective view of the tool component being assembled.

Referring particularly to FIG. 7, the one or more mandrel segment and caul plate handling mechanisms 54 may be configured to facilitate lifting and positioning the mandrel segments 76 and attaching the mandrel segments 76 to the substructure 68, to facilitate removing the mandrel segments 76 from the substructure 68, to facilitate lifting and positioning the caul plates 78 and securing the caul plates 78 (by, e.g., vacuum bagging) over the fabricated part 42 prior to curing, and to facilitate removing the caul plates 78 following curing. Referring particularly to FIG. 8, the one or more part segment handling mechanisms 56 may be configured to facilitate lifting and removing the part segments 86 from the tool 44 following fabrication, curing, and segmentation of the part 42. In various implementations, the part segment handling mechanisms 56 may include edge wedges and clamps to facilitate removal and securement of the part segment 86 from the mandrel segment 76, headers and clamps configured to facilitate removal and securement of the part segment 86 from the mandrel segment 76, and vacuum cups configured to facilitate securing the part segment 86. Each of the various handling mechanisms 54,56 may be movably positionable or fixedly positioned above, below, or beside the tool 44, as desired or required by a particular application. Each of the handling mechanisms 54,56 may employ vacuum or non-vacuum technologies for engaging the mandrel segment 76, caul plate 78, and/or part segment 86.

The automated fiber placement machine 58 may be configured to apply a composite material comprising resin and synthetic fibers onto the one or more mandrel segments 76 to fabricate the large composite part 42 as a single piece on the tool 44. The uncured material cutting mechanism 59 may be configured to cut or otherwise segment the fabricated single piece on the tool 44 into a plurality of untrimmed part segments 85 prior to curing. The autoclave or other curing mechanism 60 may be configured to cure the composite material on the one or more mandrel segments 76 to cure the large composite part 42 on the tool 44. The cured material cutting mechanism 62 may be configured to cut or otherwise segment the fabricated and cured part 42 on the tool 44 into the plurality of trimmed part segments 86 which may then be removed from the tool 44 without disassembling the tool 44. In various implementations, the cutting mechanism 62 may include drills, punches, knives, saws, and/or discs. The reassembly mechanism 64 may be configured to joining the plurality of trimmed part segments 86 so as to reform the large composite part 42 into a single piece off the tool 44. In one implementation, the reassembly mechanism 64 may include a fastener gun and the fasteners may include rivets, interference-fit fasteners, and/or bolts.

Referring to FIGS. 9-18, an example implementation of the above-described method 140 is shown adapted for fabricating the large, generally cylindrical composite fuselage part 42, wherein the composite fuselage 42 is at least partially fabricated and cured on the tool 44, cut or otherwise segmented into the plurality of part segments 86 to facilitate removing it from the tool 44 without disassembling the tool 44, removed from the tool 44, and then reassembled off the tool 44 to reform the large composite fuselage part 42. In one implementation, the method 140 may employ some or all of the components of the above-described example system 40.

The tool 44 may be assembled by attaching the one or more mandrel segments 76 to the substructure 68, as shown in 142. In one implementation, the tool 44 may be mounted on the rotatable or fixed support mechanisms 48,50, as shown in 144, and rotated or fixedly supported as desired or required, as shown in 146 and FIG. 9.

Figure 10:
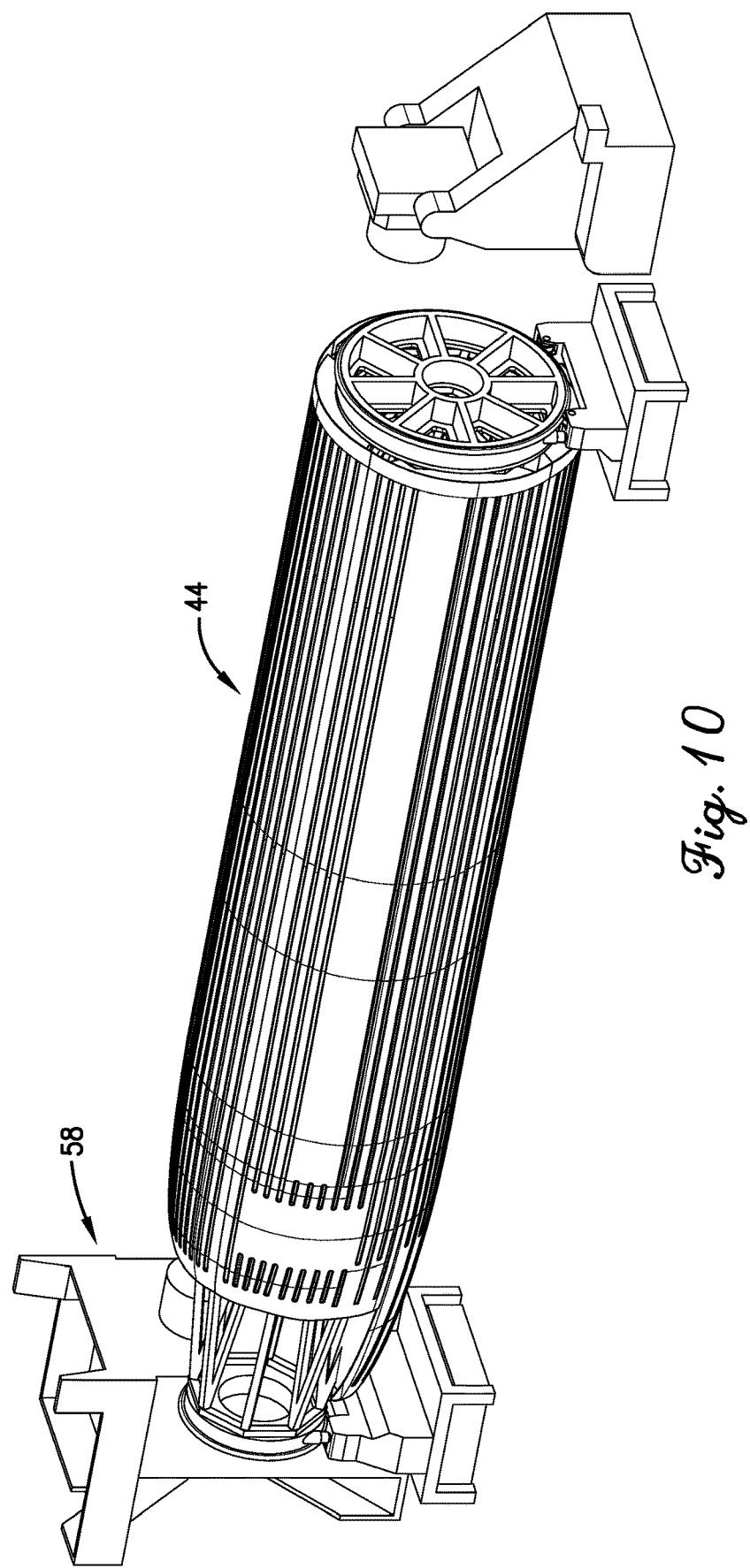
FIG. 10 is a perspective view of the tool component being transported to an automated fiber placement machine component of the system of FIG. 1.
Figure 11:
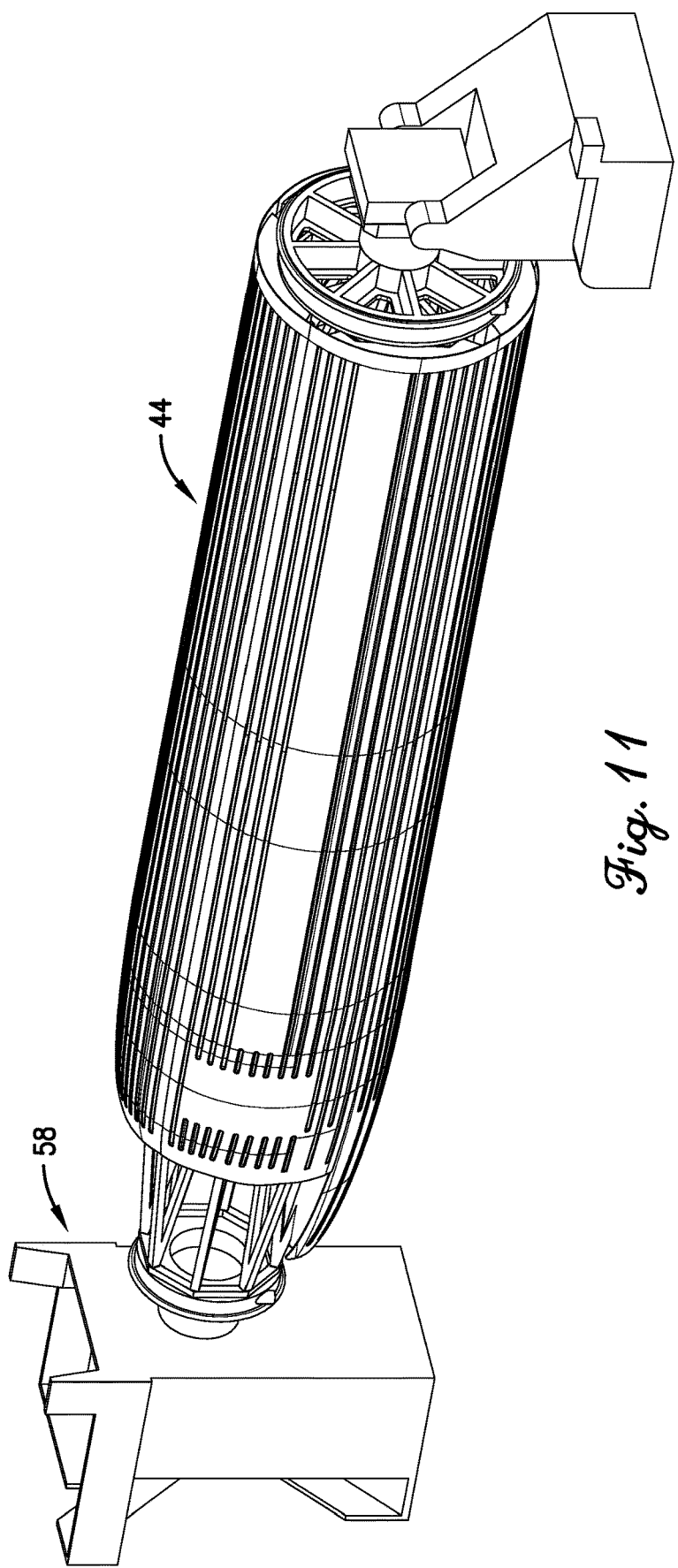
FIG. 11 is a perspective view of the tool component mounted on the automated fiber placement machine component for fabrication of the part.

The part 42 may be at least partially fabricated as a single piece on the tool 44, as shown in 148. In one implementation, the fabrication process may include installing and compacting stringer charges to form stringers on the part 42, installing and inflating bladders to form the stringers or other structural components, and installing and compacting inner mold line plies, while rotating the tool 44 as desired or needed for better access. The guide vehicles 52 may then transport the tool 44 to the automated fiber placement machine 58, as shown in FIG. 10. The automated fiber placement machine 58 may receive the tool 44, such as by engaging the interface rings 72,74, and the rotatable or fixed support mechanisms 48,50 and guided vehicles 52 may be removed. The automated fiber placement machine 58 may wrap the entire tool 44 or may wrap each mandrel segment 76 individually and apply connecting straps between individual mandrel segments 76, as shown in 150 and FIG. 11. When fabrication is complete, the tool 44 may then be disengaged from the automated fiber placement machine 58, remounted on the rotatable or fixed support mechanisms 48,50 and guided vehicles 50, and transported to the caul plate handling mechanisms 54.

Figure 12:
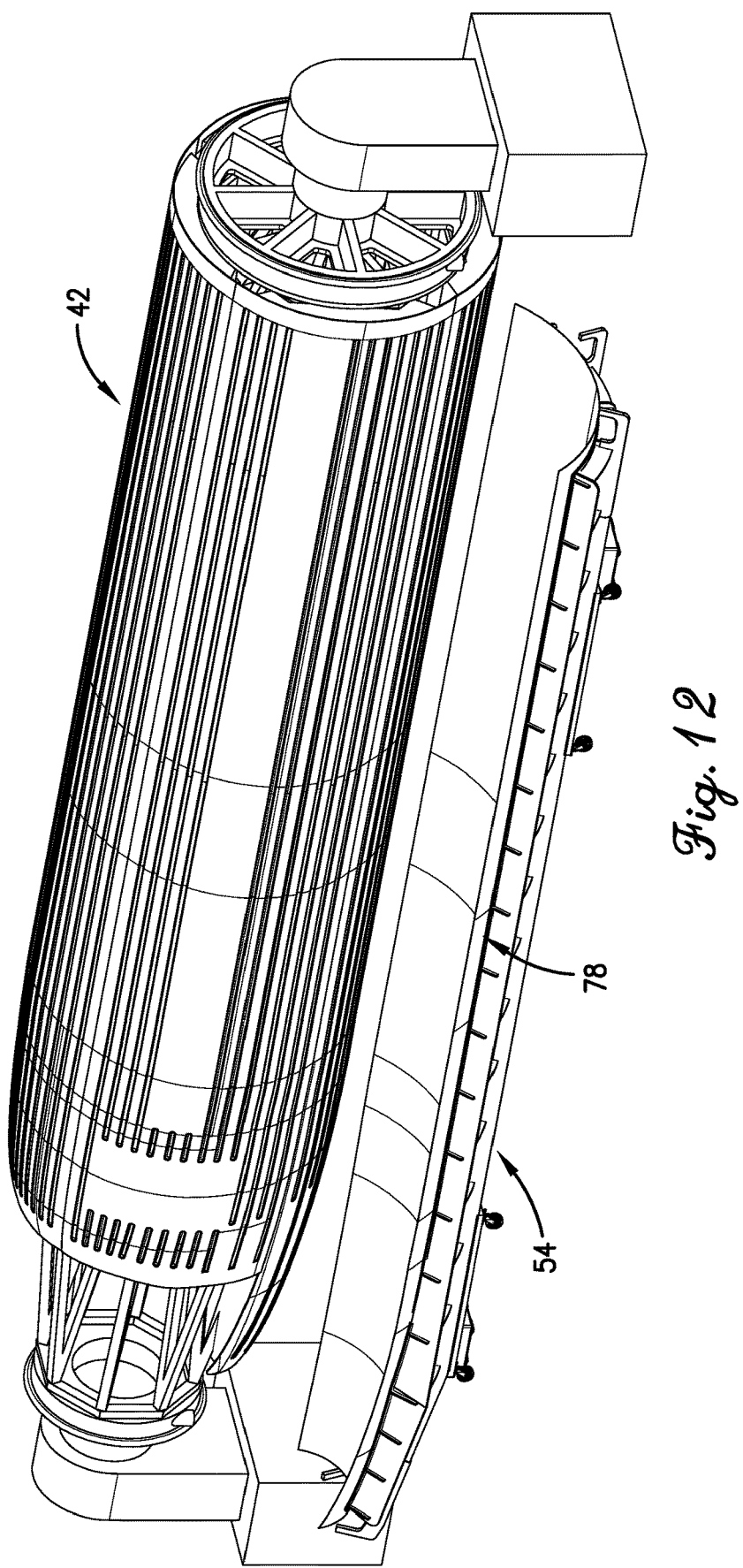
FIG. 12 is a perspective view of the caul plate component being secured over the part prior to curing.
Figure 13:
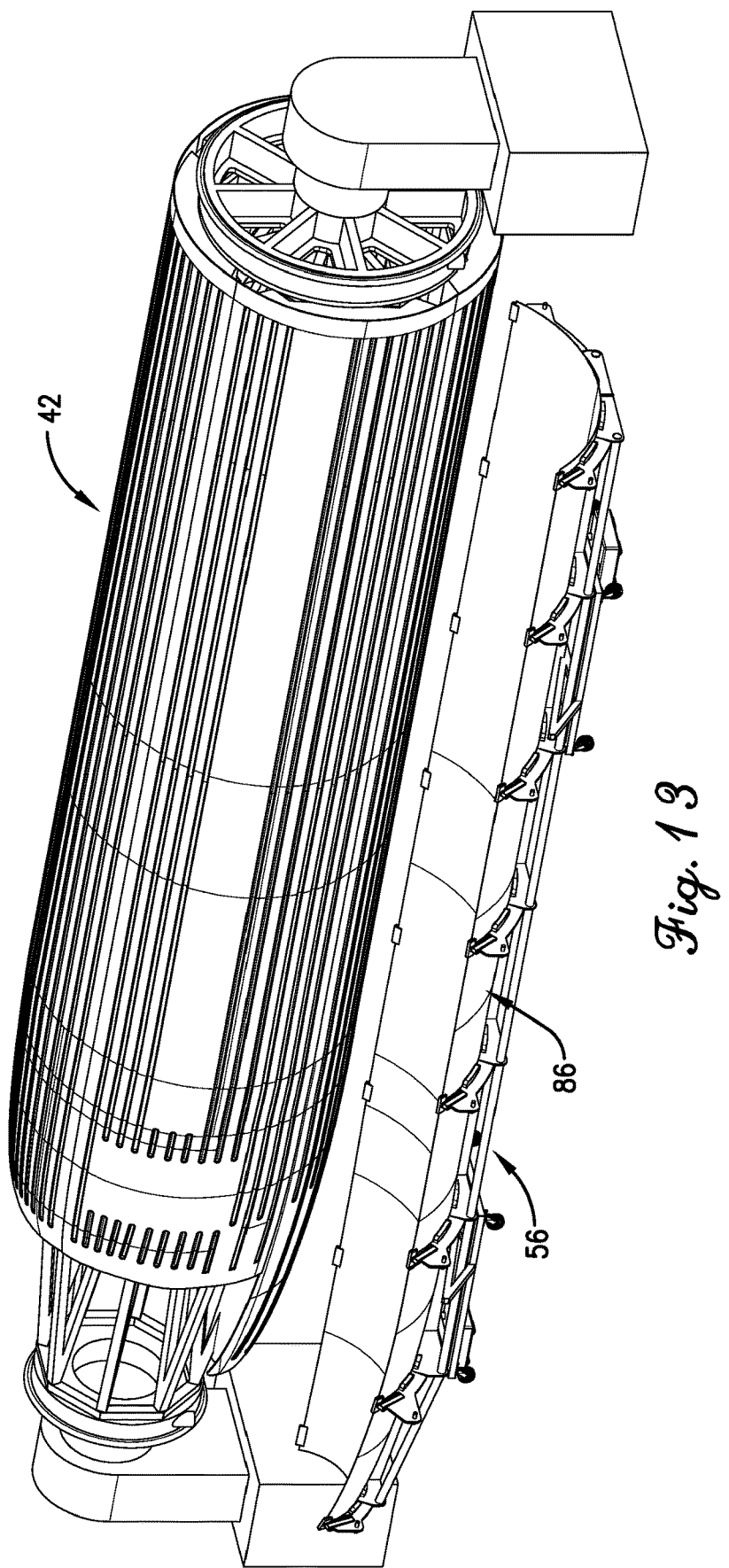
FIG. 13 is a perspective view of a part segment being removed from the tool component following curing and cutting of the part.
Figure 14:
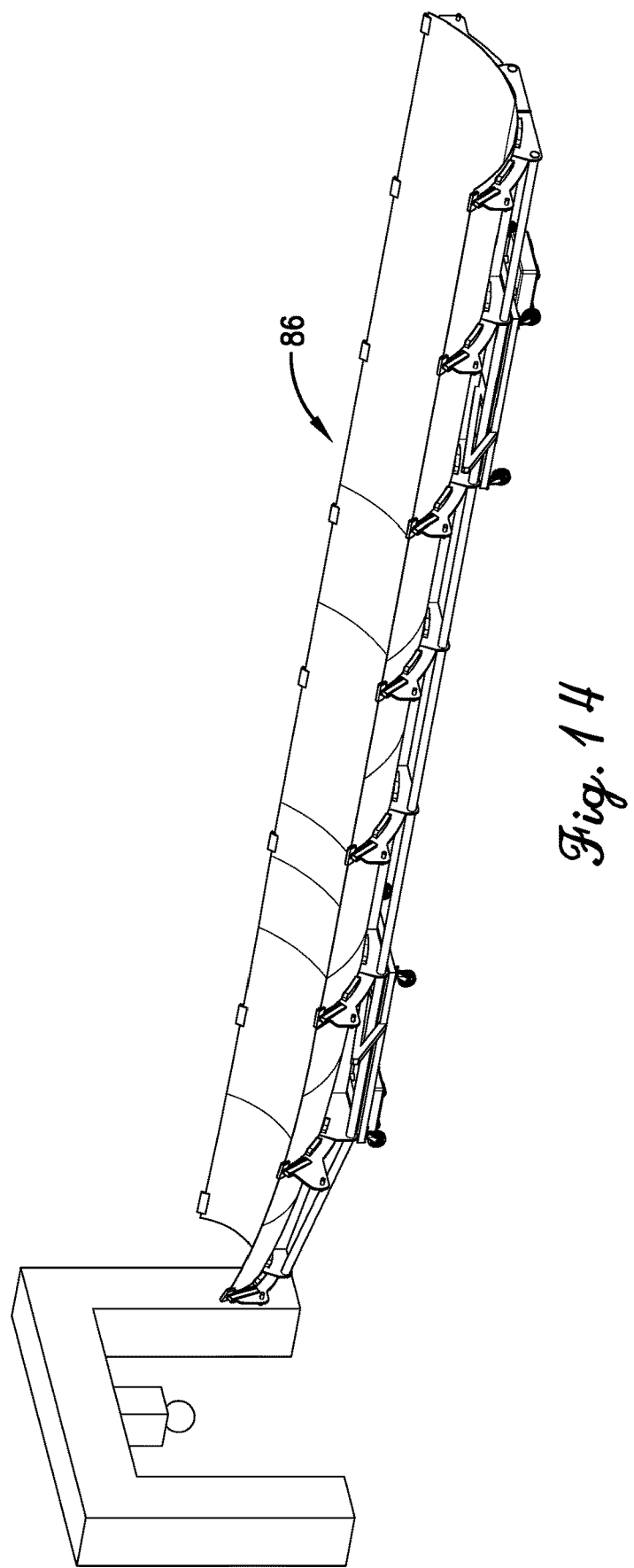
FIG. 14 is a perspective of the part segment being trimmed and/or drilled.
Figure 15:
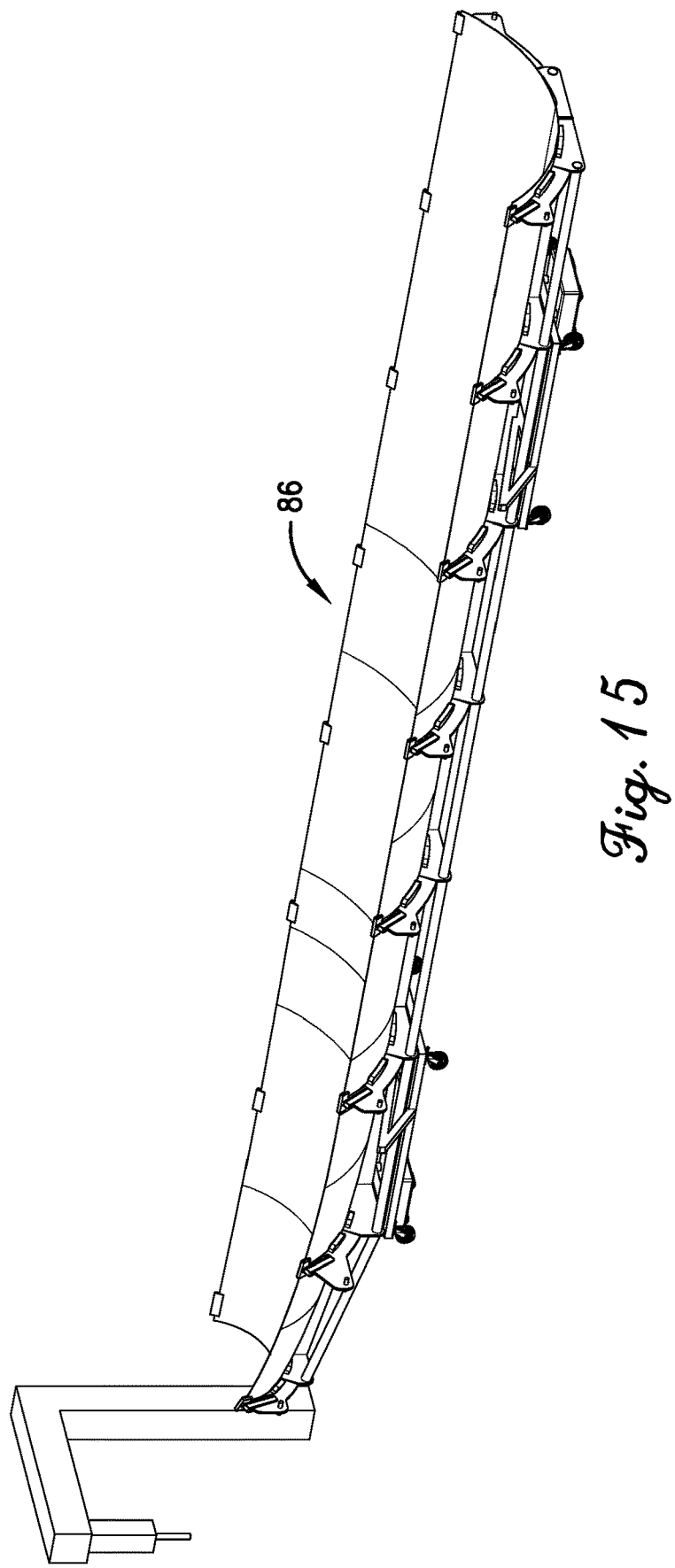
FIG. 15 is a perspective view of the part segment undergoing inspection of an inner mold line.
Figure 16:
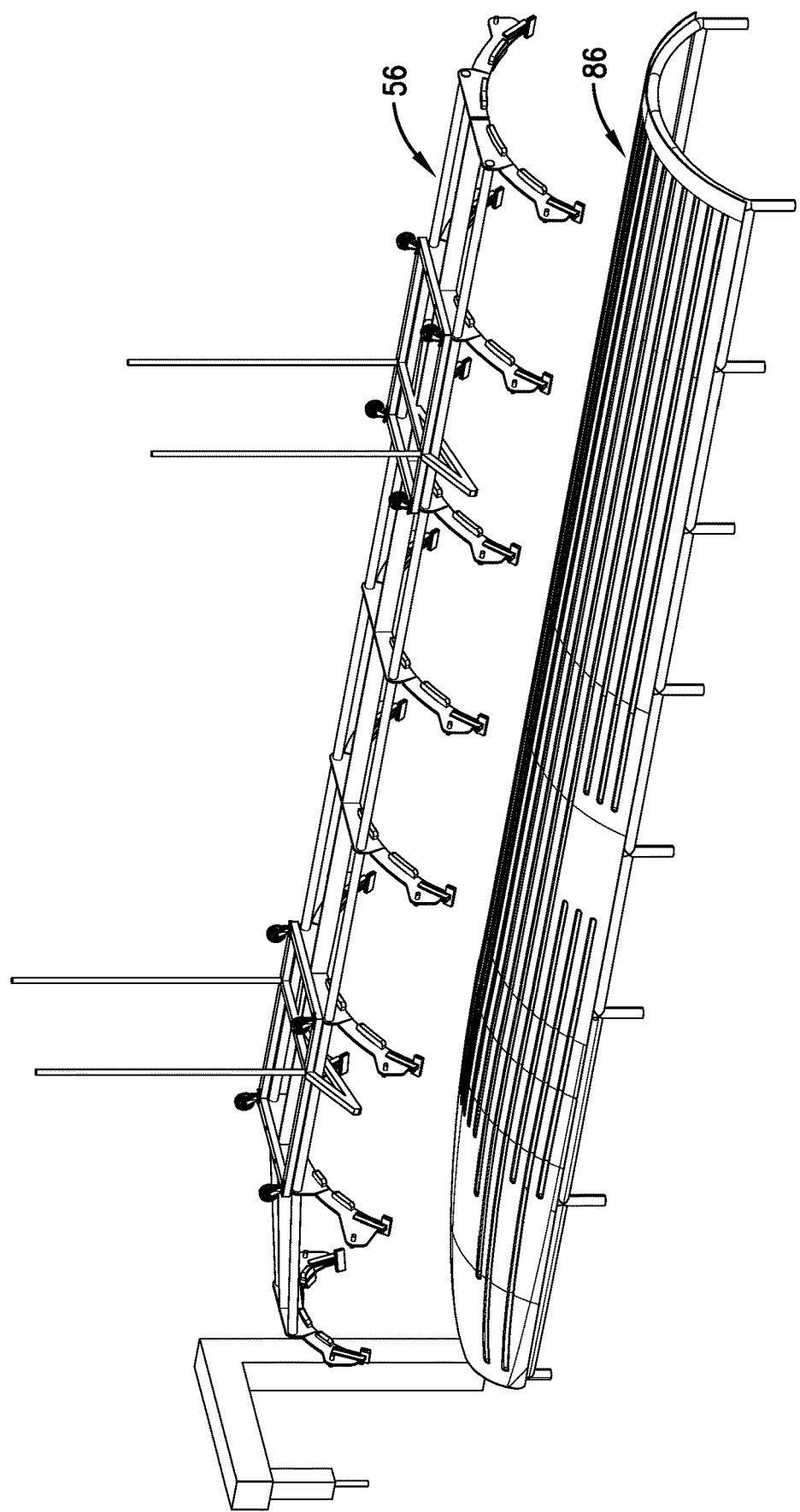
FIG. 16 is a perspective view of the part segment undergoing inspection of an outer mold line.
Figure 17:
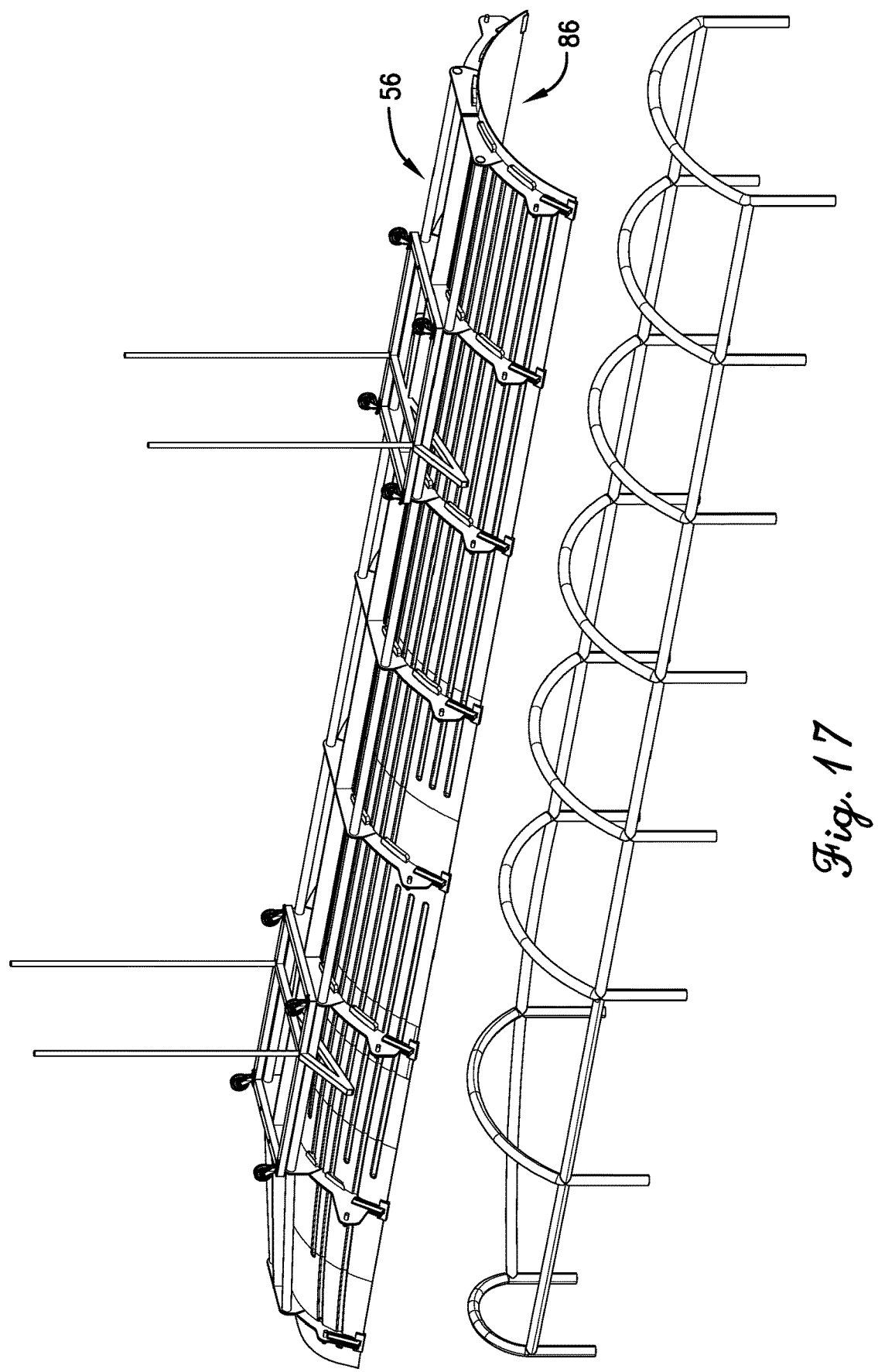
FIG. 17 is a perspective view of the part segment being positioned for reassembly with other part segments to reform the large composite structure.

The one or more caul plates 78 may be secured (by, e.g., vacuum bagging) over the fabricated part 42, as shown in 152 and FIG. 12. In one implementation, the large composite part may be cut or otherwise segmented with the uncured material cutting mechanism 59 into the plurality of untrimmed part segments 85 prior to the curing process, as shown in 153. In one implementation, the tool 44, with the caul plates installed 78, may be transported to the curing mechanism 60 for curing. The fabricated part 42 may be at least partially cured by the curing mechanism 60 on the tool 44, as shown in 154. In one implementation, following curing, the tool 44 may be moved to the caul plate handling mechanism 54 and the caul plates 78 may be removed.

The at least partially fabricated and cured part 42 may be cut or otherwise segmented by the cutting mechanism 62 into the plurality of trimmed part segments 86 prior to removal from the tool 44, as shown in 156. The trimmed part segments 86 may be removed from the tool 44 by the part segment handling mechanism 56 without disassembling the tool 44, as shown in 158 and FIG. 13. In one implementation, the part segments 86 may be further trimmed and/or drilled prior to removal from the tool 44. The part segments 86 may be reassembled off the tool 44 to reform the single piece large composite fuselage 42, as shown in 160 and FIG. 17. In one implementation, this may include further trimming and/or drilling and/or non-destructive inspection of the part segments 86 prior to, during, and or after reassembly, as shown in 162 and FIGS. 14-16. Non-destructive inspection may be performed for, e.g., inner mold line, outer mold lines, and/or stringers or other structural components.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method for fabricating and curing a large composite part, the method comprising:
   supporting with a tool the large composite part during a fabrication process and a curing process, wherein the tool comprises:
   a substructure, and
   one or more mandrel segments removably attached to the substructure and providing a surface on which the large composite part is fabricated,
   wherein the substructure is constructed of a first material having a first coefficient of thermal expansion and the one or more mandrel segments are constructed of a second material having a second coefficient of thermal expansion which is lower than the first coefficient of thermal expansion, and wherein the one or more mandrel segments are fixedly attached to the substructure at at least one location and movably attached to the substructure at at least one other location;
   applying with an automated fiber placement machine a composite material comprising resin and synthetic fibers onto the one or more mandrel segments to fabricate the large composite part as a single piece on the tool;
   curing with a curing mechanism the composite material on the one or more mandrel segments to cure the large composite part on the tool;
   cutting with a cured material cutting mechanism the large composite part on the tool into a plurality of trimmed part segments which are then removed from the tool without disassembling the tool; and
   joining with a reassembly mechanism the plurality of trimmed part segments to reassemble the large composite part off the tool.

2. The method of claim 1, wherein the large composite structure is an aircraft fuselage which has a length of at least five meters.

3. The method of claim 1, wherein the one or more mandrel segments comprise one or more structure features creating one or more corresponding structure components in the large composite part.

4. The method of claim 1, wherein the one or more mandrel segments comprise grooves accommodating the cured material cutting mechanism when cutting the large composite part into the plurality of trimmed part segments.

5. The method of claim 1, wherein the one or more mandrel segments comprise joining features creating one or more corresponding joining components in the plurality of trimmed part segments which facilitate joining the plurality of trimmed part segments to reassemble the large composite part.

6. The method of claim 1, wherein:
   the curing mechanism comprises an autoclave;
   the cured material cutting mechanism comprises a cutting disc; and
   the reassembly mechanism comprises a fastener gun.

7. The method of claim 1, further comprising securing one or more caul plates over the composite material on the one or more mandrel segments prior to curing the composite material.

8. A method for fabricating and curing a large composite aircraft fuselage which has a length of at least five meters, the method comprising:
   supporting with a tool the large composite aircraft fuselage during a fabrication process and a curing process, wherein the tool comprises:
   a substructure constructed of steel, and
   at least two mandrel segments removably attached to the substructure by moveable attachments and providing a surface on which the large composite aircraft fuselage is fabricated, wherein the one or more mandrel segments comprise one or more structure features creating one or more corresponding stinger components in the large composite aircraft fuselage;
   applying with an automated fiber placement machine a composite material comprising resin and synthetic fibers onto the one or more mandrel segments to fabricate the large composite aircraft fuselage as a single piece on the tool;
   securing one or more caul plates over the composite material on the at least two mandrel segments;
   cutting with an uncured material cutting mechanism the composite material on the at least two mandrel segments into a plurality of untrimmed part segments;
   curing with an autoclave the composite material on the one or more mandrel segments to cure the large composite aircraft fuselage on the tool;
   cutting with a cured material cutting mechanism the large composite aircraft fuselage on the tool into a plurality of trimmed part segments which are then removed from the tool without disassembling the tool; and
   joining with a reassembly mechanism the plurality of trimmed part segments to reassemble the large composite aircraft fuselage off the tool.

9. A method for fabricating and curing a large composite part, the method comprising:
   supporting with a tool the large composite part during a fabrication process and a curing process, wherein the tool comprises:
   a substructure, and
   a plurality of mandrel segments removably attached to the substructure and providing a surface on which the large composite part is fabricated;
   applying with an automated fiber placement machine a composite material comprising resin and synthetic fibers onto the plurality of mandrel segments to fabricate the large composite part as a single piece on the tool;
   cutting with an uncured material cutting mechanism the large composite part on the tool into a plurality of untrimmed part segments prior to the curing process;
   curing with a curing mechanism the composite material on the plurality of mandrel segments to cure the plurality of untrimmed part segments on the tool;
   cutting with a cured material cutting mechanism the plurality of untrimmed part segments on the tool into a plurality of trimmed part segments which are then removed from the tool without disassembling the tool; and
   joining with a reassembly mechanism the plurality of trimmed part segments to reassemble the large composite part off the tool.

* * * * *